United States Patent [19]

Turner et al.

[11] Patent Number: 5,196,502
[45] Date of Patent: Mar. 23, 1993

[54] METHOD FOR THE PREPARATION OF MULTIPLY-BRANCHED AROMATIC POLYESTERS

[75] Inventors: S. Richard Turner, Pittsford; Brigitte I. Voit; Ralph B. Nielsen, both of Rochester, all of N.Y.

[73] Assignee: Eastman Kodak Company, Rochester, N.Y.

[21] Appl. No.: 788,070

[22] Filed: Nov. 5, 1991

[51] Int. Cl.$^5$ .......................................... C08G 63/00
[52] U.S. Cl. .................................. 528/272; 528/125; 528/167; 528/173; 528/205; 528/206; 528/208; 528/327
[58] Field of Search ............... 528/271, 272, 125, 173, 528/167, 205, 206, 208, 327

[56] References Cited

U.S. PATENT DOCUMENTS

| | | | |
|---|---|---|---|
| 2,600,376 | 6/1952 | Caldwell et al. | 528/209 |
| 3,669,939 | 6/1972 | Baker et al. | 528/361 |
| 3,772,405 | 11/1973 | Hamb | 525/437 |
| 3,778,410 | 12/1973 | Kuhfuss et al. | 525/437 |
| 4,289,872 | 9/1981 | Denkewalter et al. | 528/328 |
| 4,507,466 | 3/1985 | Tomalia et al. | 528/332 |
| 4,857,630 | 8/1989 | Kim | 528/397 |
| 5,041,516 | 8/1981 | Frechet et al. | 528/44 |

OTHER PUBLICATIONS

Tomalia, D. A., et al. Angewandte Chemie, Int'l Edition English (1990), Starburst Dendrimers, vol. 29, pp. 138-175.
Newkome, G. R. et al, Journal of the American Chemical Society (1990) Synthesis and Characterization of 2-Dimensional Cascade Molecules and Formation of Aqueous Gels, vol. 112 pp. 8458-8465.
Uhrich, K. E. et al, Polymer Materials Science and Engineering (1991) "One-Step" Synthesis of Hyperbranched Macromolecules, vol. 64, pp.
P. J. Flory, Journal of the Amer. Chemi. Soc., (1951), Molecular Size Distribution in Three Dimensional Polymers, vol. 74, p. 2718.
Y. H. Kim et al, Journal of the Amer. Chem. Soc., (1990), "Water-Soluble Hyperbranched Polyphenylene: A Unimolecular Micelle", vol. 112, p. 4592.
Hawker et al, Journal of the Amer. Chem. Soc., (1991) One-Step Synthesis of Hyperbranched Dendritic Polyesters, vol. 113, No. 12, pp. 4583-4588.
H. R. Kricheldorf et al, (1983), Makromol. Chem., Synthesis and Characterization of Oligomeric and High Molecular Weight Poly(4-hydroxybenzoate) 184, p. 475.
Gilkey et al, Journal Applied Polymer Science, Polyesters of Hydoxybenzoic Acids (1959), vol. 2, Issue No. 5 pp. 198-202.
Kricheldorf et al, Polymer, New polymer synthesis:6*. Linear and branched poly(3-hydoxy-benzoates) (1982), vol. 23, p. 1821.
Kricheldorf, H. R. et al, Polym. Bulletin, (1981), Linear and branched poly(3-hydroxy-benzoates) vol. 6, 21 PartV.
Worthy, W., C&E News, (Feb. 22, 1988), New Families of Multibranched Macromolecules Synthesized.

(List continued on next page.)

Primary Examiner—John Kight, III
Assistant Examiner—T. Mosley
Attorney, Agent, or Firm—Robert Luke Walker

[57] ABSTRACT

An improved method for producing multiply-branched polyester comprising condensing a reactant having the general formula $Z^1$—Ar—$(Z^2)_j$, wherein j is 2 or 3, Ar is an aryl or heteroaryl group having from 1 to 3, solitary or linked or fused, five or six membered rings, and one of $Z^1$ and $Z^2$ is a carboxyl group and the other is a group having the general formula $$-O-\overset{O}{\underset{\|}{C}}-RX_g,$$

wherein R is an alkyl group having from 1 to 3 carbon atoms, X is selected from the group consisting of fluoro and chloro and g is an integer from 0 to about 7.

18 Claims, 2 Drawing Sheets

OTHER PUBLICATIONS

S. Stinson, C&E News, (1990), Systematic Synthesis Devised for Oligosiloxanes, vol. 251, p. 1562.

Hawker, C. J. et al, J. Am. Chem. Soc. (1990), Preparation of Polymers with Controlled Molecular Architecture. A New Convergent Approach to Dendritic Macromolecules, vol. 112, pp. 7638–7647.

Newkome, G. R. et al, Macromolecules, (1991), Symmetrical, Four Directional, Poly(ether-amide) Cascade Polymers, vol. 24, pp. 1443–1444.

Wooley, K. L., et al, Journal of the American Chemical Society, (1991) Hyperbranched Macromolecules via a Novel Double-Stage Convergent Growth Approach, vol. 113, pp. 4252–4261.

Padias, A. B. et al, J. Org. Chem., (1987), Starburst Polyester Dendrimers, vol. 52, pp. 5305–5312.

Hall, H. K. Jr. et al, Polymer Bulletin, (1987), "Starburst", vol. 17, pp. 409–416.

Uchida et al, J. Am. Chem. Soc. (1990), General Strategy for the Systemetic Synthesis of Oligosiloxanes Silicone Dendrimers, vol. 112, No. 23.

Buhleier, E. et al, Synthesis, (1978), "Cascade" and Nonskid-Chain-Like Synthesis of Molecular Cavity Topologies, pp. 155–158.

Frechet, et al Macromolecules (1990), vol. 23, pp. 4726–3729.

Miller, T. M. et al, Chem. Mater., (1990) Convergent Synthesis of Monodisperse Dendrimers Based upon 1,3,5-Trisubstituted Benzenes, vol. 2, pp. 346–349.

Encyclopedia of Polymer Science and Engineering, Second Edition, (1988), vol. 12, pp. 32–36.

Schiff, J. K. et al, High Polymers, Condensation Monomers, vol. 27, pp. 358–359.

Alper, J., Science, (1991) Rising Chemical "Stars" Could Play Many Roles, vol. 251, pp. 1562–1564.

METHOD FOR THE PREPARATION OF MULTIPLY-BRANCHED AROMATIC POLYESTERS

BACKGROUND OF THE INVENTION

The present invention pertains to processes for the preparation of highly branched polymers and aromatic polyesters. More particularly, the present invention pertains to processes for the preparation of multiply-branched aromatic polyesters.

Highly branched, non-crosslinked polymers have been prepared by "multiple generation" and "single generation" procedures. The multiple generation procedures are exemplified by Tomalia, D. A., et al, Angewandte Chemie, International Edition in English, 29, 138–175 (1990) and U.S. Pat. No. 5,041,516 to Frechet, J. M. J. et al, which describe the preparation of highly branched, non-crosslinked polyamidoamines and polybenzyl ethers, respectively. Tomalia et al identified the polymers produced as "starburst polymers" or "starburst dendrimers". Both publications describe preparations in which the macromolecules were prepared by repeatedly reacting, isolating and purifying a product through a series of growth steps. The product of each growth step is called a "generation". These procedures are highly laborious, but the product produced is highly uniform. Newkome et al, Journal of the American Chemical Society, Vol. 112, 8458, (1990) describes a similar step and repeat process used to build up various macromolecules described as tree-like and identified as "arborols".

Single generation procedures are much less laborious than multiple generation procedures. The single generation procedures are exemplified by Flory, P. J., Journal of the American Chemical Society, 74, p. 2718 (1952), which presents a theoretical analysis of the formation of highly branched, soluble polymers from monomers having the structure $AB_x$, in which A and B are the reactive groups, by condensation polymerization, with random branching and without cross-linking. Kim, Y. H. et al, Journal of the American Chemical Society, Vol. 112, p. 4592 (1990) and U.S. Pat. No. 4,857,630 to Y. H. Kim, describe this kind of "single generation" approach in the preparation of hyperbranched polyphenylenes. U.S. Pat. No. 3,669,939 to Baker, A. S. et al teaches highly branched, non-crosslinked, aliphatic polyesters, prepared by a "single generation" melt condensation polymerization of monomers having a single carboxylic acid functionality and multiple alcohol functionalities. Hawker, C. J., Lee, R. and Frechet, M. J. M., Journal of the American Chemical Society, Vol. 113, No. 12, (1991) pp 4583–4588, teaches a single generation procedure for the preparation of all aromatic, highly-branched, non-cross-linked polyesters. In this procedure, 3,5-bis(trimethylsiloxy)benzoyl chloride is melt polymerized by the Kricheldorf method, described in H. R. Kricheldorf et al, Makromol. Chem. 184, 475 (1983), driving off trimethylsilylchloride. The product can be subjected to hydrolysis to provide phenolic terminated highly branched polyesters. This procedure has the shortcomings of requiring expensive, water-sensitive reactants and difficult monomer preparation steps.

Linear and some slightly branched aromatic polyesters are often prepared via the "acetolysis" reaction. The use of this kind of reaction to produce a highly-branched non-crosslinked aromatic polyester has not been reported and what has been reported in the literature would lead one skilled in the art to expect that such chemistry would not perform well for the synthesis of highly branched polymers. Kricheldorf, H. R. et al in Makromol. Chem. 184, 475 (1983) and R. Gilky et al, Journal of Applied Polymer Science, 2, 198 (1959) indicated that in the preparation of poly(hydroxybenzoic acid) the condensation reaction using the acetate is accompanied by a decarboxylation side reaction. Such a decarboxylation reaction would inhibit formation of highly-branched polymer by causing large defects or low molecular weight or both. In addition Kricheldorf, H. R. et al in Polymer 23, 1821 (1982) indicated that several attempts to use 3,5-diacetoxybenzoic acid as a branching component in a co-condensation polymerization with m-hydroxybenzoic acid resulted in little if any branching. Kricheldorf states on page 1827 that ". . . the second acetyl group of (3,5-diacetoxybenzoic acid) after incorporation of the trifunctional monomer into the linear chain is not reactive enough to initiate the branching step."

SUMMARY OF THE INVENTION

The invention, in its broader aspects, provides an improved method for producing multiply-branched polyester comprising condensing a reactant having the general formula $Z^1\text{-Ar-}(Z^2)_j$, wherein j is 2 or 3, Ar is an aryl or heteroaryl group having from 1 to 3, solitary or linked or fused, five or six membered rings, and one of $Z^1$ and $Z^2$ is a carboxyl group and the other is a group having the general formula wherein R is an alkyl group having from 1 to 3 carbon atoms, X is selected from the group consisting of fluoro and chloro and g is an integer from 0 to about 7. The method of the invention, surprisingly, has the capability of producing highly-branched structures of high molecular weight having useful terminal groups and has the advantages of not requiring multiple generations of reactions and purifications or the use of trimethylsilyl benzoic acid chlorides.

DESCRIPTION OF A SPECIFIC EMBODIMENT

The method of producing multiply-branched aromatic polyesters of the invention utilizes a condensation of an "$AB_x$" monomer reactant. The reactant, which is also referred to herein as a "branching reactant", consists of one or more compounds having the general structure in which j=2 or 3. In every compound of a branching reactant, $Z^1$ or $Z^2$ is carboxyl and the other Z group has the general formula —O—CO—RX$_g$. In other words, the branching reactant is a compound or mixture of two or more compounds, all having the general structure HOOC—Ar—(O—CO—RX$_g$)$_j$ or all having the general structure X$_g$R—CO—O—Ar—(COOH)$_j$.

R is alkyl and has from 1 to about 3 carbon atoms. X is fluoro or chloro and g is an integer from 0 to about 7. Suitable RXg moieties include: —CH$_3$, —CH$_2$—CH$_3$, —CH$_2$Cl, —CHCl$_2$, —CCl$_3$, —CH$_2$F, —CHF$_2$, and —CF$_3$. If R is —CH$_3$ and g is 0, then —O—CO—RX$_g$ is —O—CO—CH$_3$. This group is usually referred to in chemical literature as either an "acetoxy group" or an "acetate group", however, as a matter of convenience, groups having the structural formula —O—CO—RX$_g$ are referred to collectively herein as if those groups were derivatives of the acetoxy group, by use of the term "substituted or unsubstituted acetoxy group" or the term "acetoxy". The term "acetate group" is used herein to refer to the group: —O—CO—CH$_3$.

Ar is an aryl or heteroaryl group having from 1 to 3, five or six membered rings. The rings are solitary or linked or fused. Ar can have additional substituents, so long as those substituents are unreactive, that is, substituents which do not have a deleterious effect, for example, condensation with Z$^1$ or Z$^2$ groups or steric hindrance or electronic deactivation of the condensation polymerization. For example, additional substituents cannot be hydroxyls, esters, aminos or sulfonic acids, since those groups would condense with Z$^1$ or Z$^2$. Acceptable substituents, which are not capable of reacting with Z$^1$ or Z$^2$ include: chloro; fluoro; cycloalkyl; and alkyl, alkoxy, and haloalkyl, all having from 1 to 4 carbons. The substituents on a ring, Z$^1$ and Z$^2$ groups and additional substituents, can be ortho or meta or para to each other.

Linked rings can be joined by a linking group selected from the group consisting of —O—, —S—,

—(CF$_2$)$_d$—.

Each T$^1$ is independently selected from the group consisting of alkyl and aryl, and d is an integer from 1 to about 6. Suitable —Ar— groups include phenyl, naphthyl, anthracyl, phenanthryl, biphenyl, phenylether, diphenylsulfone, diphenylketone, diphenylsulfide, pyridine, quinoline, -continued

, and

T$^2$ represents a group selected from aliphatic groups having from 1 to about 12 carbon atoms, and aryl groups having from 6 to about 24 carbon atoms. The total valence of each of these —Ar— groups, that is, the number of bonds to Z$^1$ and Z$^2$ groups, indicated as unfulfilled bonds in the above aromatic residue structures, is 3 or 4, thus m$^1$, m$^2$ and m$^3$ are each integers selected from 0 to 4 and m$^1$+m$^2$+m$^3$ (if any)=3 or 4.

Specific compounds suitable for use as the branching reactant in the method of the invention include:

Repeating units in the polymers produced, except those at the ends, each have the —Ar— residue bonded to an ester linkage, which in turn is bonded to the next repeating unit. The order of the ester linkage and carbonyl in each ester linkage, —Q—, depends upon $Z^1$ and $Z^2$. In an embodiment of the invention in which $Z^1$ is carboxyl and $Z^2$ is acetoxy, ester linkages have the order . . . —O—CO—, . . . —Ar—(O—CO—CH$_3$)$_j$. In an embodiment of the invention in which $Z^1$ is acetoxy and $Z^2$ is carboxyl, ester linkages have the order . . . —CO—O—. . . —AR—(COOH)$_j$.

Repeating units for the embodiment of the invention disclosed herein, can be represented by the three structural formulas:

In these formulas, j, Ar and $Z^2$ have the same meaning as above and Q is an ester linkage. For j=2, the latter two formulas are redundant and these j=2 repeating units bear either two ester linkages or a single ester linkage and an unreacted $Z^2$ group. For j=3, these repeating units bear three ester linkages or two ester linkages and an unreacted $Z^2$ group or one ester linkage and two unreacted $Z^2$ groups. As the above repeating unit formulas indicate, condensation of $Z^2$ groups of non-terminal repeating units is not complete and many non-terminal $Z^2$ groups remain unreacted after the condensation of the method of the invention. Termini or terminal repeating units have the general formula The terminal $Z^2$ groups are thus either all carboxyls or all acetoxy groups, depending upon the embodiment of the invention.

For convenience, the branching reactant is generally discussed herein as an individual compound. Using an individual compound in the method of the invention produces a multiply-branched polymer which is analogous to a homopolymer, that is, although the repeating units in a macromolecule have the above-noted differences, each of those repeating units is derived from the same compound. The method of the invention is not limited to such "homopolymers". Mixtures of two or more compounds can be used as the branching reactant, to produce a multiply-branched polymer analogous to a copolymer. Relative percentages of the different compounds used can be varied. The compounds can differ in aromatic residues, in placement of $Z^1$ and $Z^2$ groups on aromatic residues, in $RX_g$ moieties, in the number of $Z^2$ groups or in a combination of these features.

In a particular embodiment of the invention, the method of invention is limited to what can be referred to as a "self-condensation" of the branching reactant. The term "self-condensation" describes the condensation of subunits of the branching reactant with each other. Those subunits can be contributed by one compound or a mixture of compounds. In an alternative embodiment of the invention, the branching reactant is self-condensed and co-condensed with a non-branching reactant, which has the general structure in which e is 0 or 1. If e is 0, the non-branching reactant provides "end-capping" repeating units which terminate branches of the multiply-branched polymer. If e is 1, the non-branching reactant provides additional linear repeating units in the multiply-branched polymer. The end-capped termini and additional linear repeating units are, in effect, defects in that branching is reduced. Defects are desirably kept to a small percentage of repeating units. The polymers of the invention do not include a percentage of non-branching repeating units great enough to destroy multiple branching in the polymer and produce a polymer in which branches do not themselves also branch.

It is necessary that a selected reactant polymerize under the reaction conditions employed. It is desirable that the reactants be sufficiently stable under the reaction conditions employed and that the reactants be free of groups which unduly retard the reaction by steric hindrance or other means. It is also desirable that the reactants not be subject to an unacceptable amount of undesirable side reactions, to prevent the formation of an unacceptable amount of by-product, for example, an unacceptable amount of linear repeating units.

The multiply-branched aromatic polyesters of embodiments of the method of the invention disclosed in the Examples, have weight average molecular weights ($M_w$) in the range of from about 970 to about 1,250,000 and number average molecular weights ($M_n$) in the range of from about 540 to about 50,000, however, theoretically there is no upper limit on molecular weight. Polydispersity in those embodiments is about 1.8–100. In a particular embodiment of the invention disclosed in Example 5, the ratio of the sum of branched and terminal repeating units divided by the total number of repeating units is equal to about 0.5. For a completely branched polymer this value would equal 1.0.

The exposed terminal groups of the multiply-branched aromatic polyesters can be reacted to modify the exposed terminal groups or attach other molecules to the termini or to cross-link the termini either within a polymer molecule or between polymer molecules. Suitable reactions are those of equivalent terminal groups of linear aromatic polyesters, such as: hydrolysis of the $-O-CO-RX_g$ group, ester formation, amide formation, and urethane formation. Functional groups that can be thus provided as termini of the multiply-branched aromatic polyesters include: phenol; carboxylic acid; carboxylic acid chloride, perfluorinated aryl or alkyl; primary, secondary and tertiary amine groups; aryl halides such as —Cl, —Br, and —I; and benzyl chloride groups. Polymers can be joined to termini to provide star copolymers in which polymer arms are grafted to termini of the multiply-branched aromatic polyester core. Particularly convenient polymers for grafting are those having —OH, —NH$_2$, —COOH, —Cl, —Br, and —I end groups, which can be joined to terminal acetoxy, phenol or carboxyl groups by reactions well known to those skilled in the art.

The method of the invention can be conducted in the presence of a catalyst to enhance the rate of reaction. Catalysts useful in the method of the invention include condensation catalysts useful in the production of linear polyesters; for example: Mg, MgO, and titanium compounds such as ((BuO)$_4$Ti), and TiO$_2$. A catalytic amount of catalyst is employed. By "catalytic amount" is meant an amount of catalyst which catalyzes the reaction to the desired extent. Generally, the amount of catalyst is at least about 0.005 mole percent based on the molar amount of reactant. There is no real upper or lower limit on the amount of catalyst, this being defined by secondary considerations such as cost and ease of separation of the catalyst from products and unreacted reactants. A preferred catalytic amount is from about 0.01 to about 1.0 mole percent based upon the molar amount of reactant. The catalyst can be bound to a support or unsupported.

The polymerization reaction is preferably carried out in the absence of solvent by merely heating the reactant. The polymerization reaction can be conducted in the presence of solvent, which appreciably dissolves reactants to provide a liquid reaction medium. The use of solvent slows the rate of reaction, in comparison to a melt polymerization. If solvent is used, it is desirable that the solvent be "inert" to the reaction, i.e., that the solvent not enter into the reaction in an undesired way. It is desirable that the solvent have a high boiling temperature so that elevated temperatures can be used in the reaction. The invention is not limited to a particular solvent or solvent system and a wide variety of solvents can be used. Examples of solvents are dimethylformamide and tetramethylenesulfone. The amount of solvent present is not critical, however, practical limits are imposed by the reduced reaction rate, the ease of separation of product from the reaction medium, cost and other factors. The reaction can also be carried out in the presence of a high boiling non-solvent or diluent such as biphenyl or Marlotherm-S. The purpose of this medium is to aid in heat transfer and processability of the polymerization monomer.

During the polymerization reaction an acid of the acetoxy group, that is, HO—CO—RX$_g$, also referred to herein as "acetoxy acid", is produced and evolves from the reaction melt or solution or mixture. For example, if the —O—CO—RX$_g$ group is —O—CO—CH$_3$, then the acetoxy acid produced is acetic acid. Removal of the acetoxy acid provides a driving force for completion of the polymerization reaction. The acetoxy acid can be removed by passing a stream of an inert gas such as nitrogen or argon over or through the reaction mass at atmospheric or superatmospheric pressure or alternatively by applying a vacuum to the reaction apparatus. The acetoxy acid may be collected for some other use. The acetoxy acid can also be removed by such means as reacting the acetoxy acid with a macromolecular base such as polyvinylpyridine, however, use of a base and in particular use of a small molecule base presents a serious risk of stopping the reaction and is thus not preferred. As a skilled practitioner will recognize, the specific means used to drive the polymerization reaction is not critical.

A suitable reaction temperature for the method of the invention, affords a reasonable rate of reaction and does not give an undue amount of decomposition of products or reactants or solvent. The polymerization reaction is generally conducted at a temperature above about 140° C. Although the reaction can be conducted at temperatures below 140° C., the polymerization reaction is much slower and molecular weight of product may be reduced. The upper temperature limit on the polymerization reaction is determined by decomposition temperatures. A suitable temperature range is 160°–300° C. The process of this invention is preferably conducted at a temperature within the range of from about 160° C. to about 240° C. for di- and tri- acetoxy reactants and within the range of from about 210° C. to about 270° C. for di- and tri-carboxyl reactants.

The reaction time is not a truly independent variable but is dependent at least to some extent on the other reaction parameters selected such as the reactivity of reactant, absence or presence of catalyst, reaction temperature, physical properties of the desired product and so forth. Generally, reaction times within the range of from about 0.5 to about 20 hours are used.

Agitation of the reaction mixture or solution is optional, however agitation assists in the production and yield of the polymer. Agitation of the reaction mixture can be accomplished by any known method, such as mechanical stirring.

The polymerization reaction has been carried out in a batch reaction vessel. It is proposed that the polymerization reaction could be carried out as a continuous or semi-continuous process. It is further proposed that it might be preferred that the polymerization reaction would be conducted on a continuous basis as a melt in a continuous staged reactor. In that continuous process, an inert gas, such as nitrogen or argon could be passed though the melt, preferably in a countercurrent direction, thereby accomplishing agitation and mixing of the reaction melt and at the same time removing the acetoxy acid evolved. Alternatively, in that continuous process, a vacuum could be applied to the reactor to remove the acetoxy acid as it is generated.

Uses for the multi-branched aromatic polyesters of the invention depend upon the nature of the terminal groups. Polymers of the invention having terminal acetoxy groups are soluble in various organic solvents and can be used as high solids industrial coatings. Carboxyl terminal groups of other polymers of the invention can be converted to carboxylates to provide ionomers which are soluble in aqueous media and can be used for coatings, additives and the like.

Reactants useful in the methods of the invention can be produced using procedures exemplified by the following preparations.

Preparation of 5-Acetoxyisophthalic Acid 5-hydroxyisophthalic acid (45.5 grams, 0.25 mole) was heated in acetic acid anhydride (102 grams, 1 mole) to reflux for one-half hour until dissolved. Refluxing was continued for a total time of 5 hours. Excess acetic acid anhydride was removed in vacuum and white product was recrystallized twice from a chloroform-/toluene (50/50 weight/weight) mixture. Yield was 48 grams, which was 86% of theoretical yield. A melting point was determined, as in all of the preparations and examples using a Thomas-Hoover melting point apparatus, which indicated onset of decomposition, and apparent release of acetic acid, at a temperature of about 235° C. Nuclear magnetic resonance (NMR) performed on a 300 MHz GE instrument using deuterated dimethylsulfoxide (DMSO-$d_6$) gave the following peaks (in parts per million (ppm)): 2.25 (s,3H), 7.8 (s,2H), 8.3 (s,1H),13.4 (broad, 2H, COOH).

Preparation of 3,4,5-triacetoxybenzoic Acid

In a one liter round bottom flask, with a magnetic stirrer, were combined gallic acid (170.1 g, 1.0 mole) and acetic anhydride (566 ml, 6 moles). The slurry was stirred as sulfuric acid (1.06 ml) was added. The temperature rose rapidly from 21° C. to 75° C. over about 1 minute and the slurry became a clear yellow solution. The mixture was stirred and allowed to cool to ambient temperature over 20 minutes. The solution was then poured into a stirred, four liter Erlenmeyer flask containing three liters of water. After 2.5 hours, white crystalline product was isolated by filtration and washed 3 times with 500 milliliters of water. The product was dried in a stream of air for 3 hours and then vacuum dried overnight. Yield was 262 grams, which was 88% of theoretical yield. Melting point was 166°-168° C. NMR conducted as in the preceeding preparation, but using (CDCl$_3$) gave as peaks, in ppm: 2.30 (s, 9H), 7.86 (s, 2H), 11.95 (broad, 1H).

Preparation of 3.5-diacetoxybenzoic Acid 3,5-Dihydroxybenzoic acid (77grams, 0.5 mole) and 200 milliliters of acetic anhydride were mixed in a five hundred milliliter round-bottomed flask, which was fitted with a reflux condenser. As the mixture was heated to reflux the dihydroxyacid went into solution. Refluxing was continued for a total of 5 hours. A brown solution was obtained. Excess acetic anhydride was removed by rotary evaporation and the remaining solid was dried under vacuum at 40° C. The solid was dissolved in about 200 milliliters of refluxing chloroform, filtered hot and then diluted with 70 milliliters of petroleum ether (bp 60°-80° C.). The compound crystallized overnight and was isolated by filtration and washed with a 1:1 mixture of petroleum ether and chloroform. The compound was then recrystallized by the same procedure. Yield was 59 grams (50%) of white crystals. Melting point was 157°-159° C. NMR conducted as in the preceeding preparation, but using (DMSO-$d_6$) gave as peaks, in ppm: 2.1 (s,6H), 7.23 (s, 1H), 7.55 (s, 2H), 13.3 (b, 1H).

Preparation of 3-acetoxybenzoic acid 3-hydroxybenzoic acid (24.7 grams, 0.2 mole) and acetic anhydride (40.8 grams, 0.4 mole) were mixed and heated to reflux for 3 hours. The reaction mixture was poured into water and stirred for 3 hours at room temperature. The product precipitated, was collected by filtration and recrystallized from chloroform. Yield was 21grams (58%) of white crystals. Melting point was 128°-129.5° C. Proton NMR conducted as in the preceeding preparation, but using (DMSO-$d_6$) gave as peaks, in ppm: 2.24 (s,3H), 7.35, 7.55, 7.65, 7.8 (m, 4H), 13.2 (b, 1H).

The following Comparative Example was based upon the procedures taught by Hawker, C. J., Lee, R. and Frechet, M. J. M., Journal of the American Chemical Society, Vol. 113, No. 12, (1991) pp 4583-4588.

COMPARATIVE EXAMPLE

Figure 2:
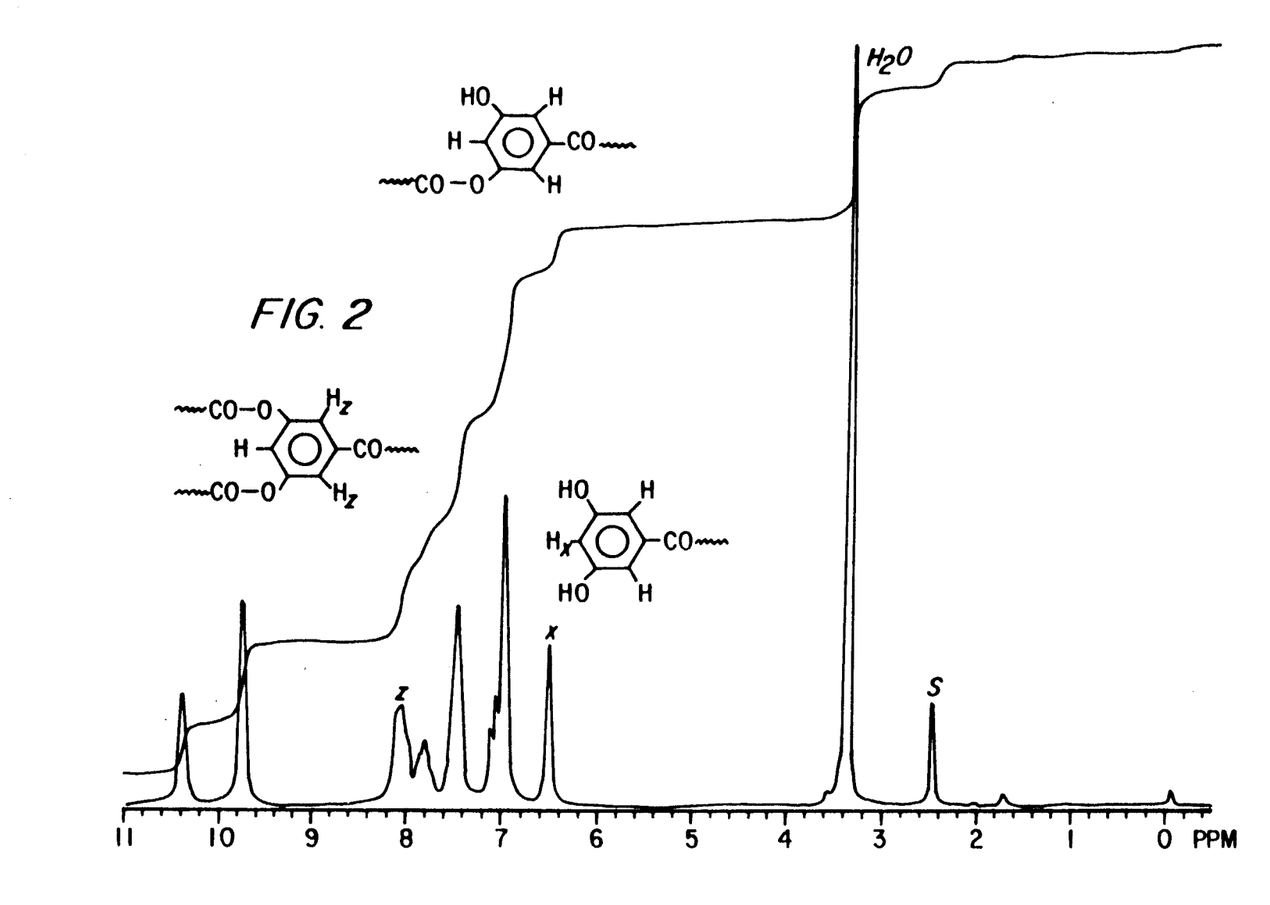
FIG. 2 is a proton nuclear magnetic resonance spectrum of the polymer of the Comparative Example, in which specific peaks are identified.

Bis(trimethylsiloxy)benzoyl chloride (5 grams, 0.016 mole) and trimethylammonium chloride (30 milligrams, 2 mole percent) were mixed in a flask and heated under a slow nitrogen stream at 140°-155° C. for 3 hours. A vacuum of about $10^{-2}$ torr was then applied for 30 minutes. The flask was cooled to room temperature and the polymer was dissolved in a mixture of tetrahydrofuran (50 parts by volume), acetone (50 parts by volume), and dimethylsulfoxide (2 parts by volume). The solution was filtered and the polymer was precipitated into water. The polymer was collected and redissolved in a mixture of tetrahydrofuran (800 parts by volume), methanol (200 parts by volume), and concentrated hydrochloric acid (1 part by volume) to remove all the trimethylsilyl groups. The polymer solution was stirred for 10 minutes and then precipitated into water, collected, and dried. Molecular weight was determined by the procedure disclosed in Example 1, after conversion of carboxyl groups with MTBSTFA, and gave a value for $M_w$ (with MTBSTFA protection) of 27,000. $T_g$ was determined to be 220° C. NMR conducted as in the preceeding preparations, using (DMSO-d$_6$) gave the spectrum shown in FIG. 2, which has as peaks, in ppm: 6.4–8.2 aromatic protons, 9.7 and 10.4 OH-protons.

The following examples are presented for a further understanding of the invention:

EXAMPLE 1

Polycondensation of 5-acetoxyisophthalic acid 5-acetoxyisophthalic acid (6 grams, 0.027 mole) was placed in a condensation flask and twice evacuated and flushed with argon to remove oxygen. The flask was equipped with nitrogen inlet, mechanical glass stirrer with a teflon blade and a gas outlet for the acetic acid. The polycondensation was carried out in a salt bath maintained at 250° C. No catalyst was added. After about 5 minutes, when the reactant was melted, a slow nitrogen stream was flushed through the polycondensation system. After about 5 minutes, acetic acid began distilling out of the reaction mixture. The reaction was continued for 30 minutes until stirring was no longer possible due to polymer formation. The nitrogen stream was stopped and a vacuum of $2 \times 10^{-2}$ torr was applied to the system for 90 minutes to remove all of the acetic acid. When a white, foamed polymer was obtained, the reaction was stopped by flushing the system with nitrogen and cooling to room temperature. The polymer was heated to reflux in a mixture of 100 milliliters of tetrahyrofuran (THF), 40 milliliters of methanol and 10 milliliters of water for 4 hours, to break the hydrogen bonding with reactant carboxyl groups and dissolve the obtained polymer. A clear solution was obtained. Solvent was removed by rotary evaporation, the polymer redissolved in pure, hot THF and precipitated into water. White polymer with carboxylic end groups was collected and dried at 60° C. in vacuum. Yield was 3.8 grams, which was 86% of theoretical yield. Tg=254° C. Decomposition onset temperature was 490° C. In order to protect the polymer product during molecular weight determination, the polymer was reacted with N-(tert-butyldimethylsilyl)-N-methyltrifluoroacetamide (MTBSTFA) to convert carboxyl groups to dimethyl-t-butylsilylester groups. Molecular weight data were obtained with a size exclusion chromatography (SEC) system using coupled low angle laser light scattering, differential viscometry and refractive index detection and having three 7.5 mmm. i.d. $\times$300 mm. 10 micrometer particle diameter PLgel mixed-bed columns marketed by Polymer Laboratories of Amherst, Mass. coupled in series calibrated against universal calibration standards. Mw after conversion of carboxyl groups with MTBSTFA was determined to be 36,500. NMR conducted as in the preceeding preparation, using (DMSO-d$_6$) gave as peaks, in ppm: broad signals between 7.4 and 8.8 ppm (aromatic H, 3H), proton of the carboxylic acid at 13.4 (1H, broad).

EXAMPLE 2

Preparation of Water Soluble Polyester from the Product of Example 1

The polymer product of Example 1 (1 gram) was dissolved in hot THF. Aqueous NaOH (6 ml of 1 Normal NaOH diluted in 50 milliliters of water) was added and the mixture was stirred for 30 minutes at room temperature. The THF was removed in vacuum to provide a water solution (pH 6–7) of the polymer with sodium carboxylate end groups.

EXAMPLE 3

Polymerization of 3,4,5-Triacetoxybenzoic Acid 3,4,5-Triacetoxybenzoic acid (20.0 grams, 0.067 mole), p-toluenesulfonic acid monohydrate (10 mg, 0.87 mole %), and Irganox 1010 (8 mg, an antioxidant marketed by Ciba-Geigy Corp of Hawthorne, New York) were combined in a condensation vessel, equipped as described in Example 1, under nitrogen atmosphere, and the mixture was heated to 220°–240° C. for 1 hour, during which time approximately 3 milliliters of distillate was collected. The pressure was reduced to approximately 0.3 torr for an additional hour at 240° C., to give a brown viscous melt. The melt was cooled, and 11.4 grams of glassy, amber solid was obtained, which was a theoretical yield of 71%. The product was soluble in methylene chloride and tetrahydrofuran at room temperature (20° C.). Mw, determined by SEC as in Example 1 but without protection using MTBSTFA, was 20,000. NMR conducted as in the preceeding example, using (CDCl$_3$) gave as peaks, in ppm: 2.28 (s, broad), 7.91 and 7.97 (m, broad), area ratio 3.07:1.

EXAMPLE 4

Uncatalyzed Polycondensation of 3,5-Diacetoxybenzoic Acid 3,5-Diacetoxybenzoic acid (10 grams, 0.042 mole) was placed in a condensation vessel, equipped as described in Example 1, under argon. The polycondensation was carried out in a salt bath maintained at 180°–185° C. No catalyst was added. After about 5 minutes, when the reactant had melted, a slow nitrogen stream was flushed through the polycondensation system. After about 5 minutes, acetic acid began distilling out of the reaction mixture. The reaction was continued for 3 hours until stirring became difficult due to polymer formation. The nitrogen stream was stopped and a vacuum of $10^{-2}$ torr was applied to the system for about 1 hour. When an elastic, almost colorless polymer was obtained, the reaction was stopped by flushing the system with nitrogen and cooling to room temperature. The polymer product was very brittle at room temperature and easily broken into small pieces. The polymer was dissolved in room temperature THF by stirring overnight. Precipitation into methanol provided a white powder with a yield of 6.4 grams, which was 86% of theoretical yield. The polymer was found to have weight average molecular weight of 30,000 determined by size exclusion chromatography, conducted as in Example 1 but without protection using MTBSTFA. NMR conducted as in the preceeding example, using (DMSO-d$_6$) gave as peaks, in ppm: 2.25 (3H), 4 broad signals between 7.25d and 8.18d (3H).

EXAMPLE 5

Figure 1:
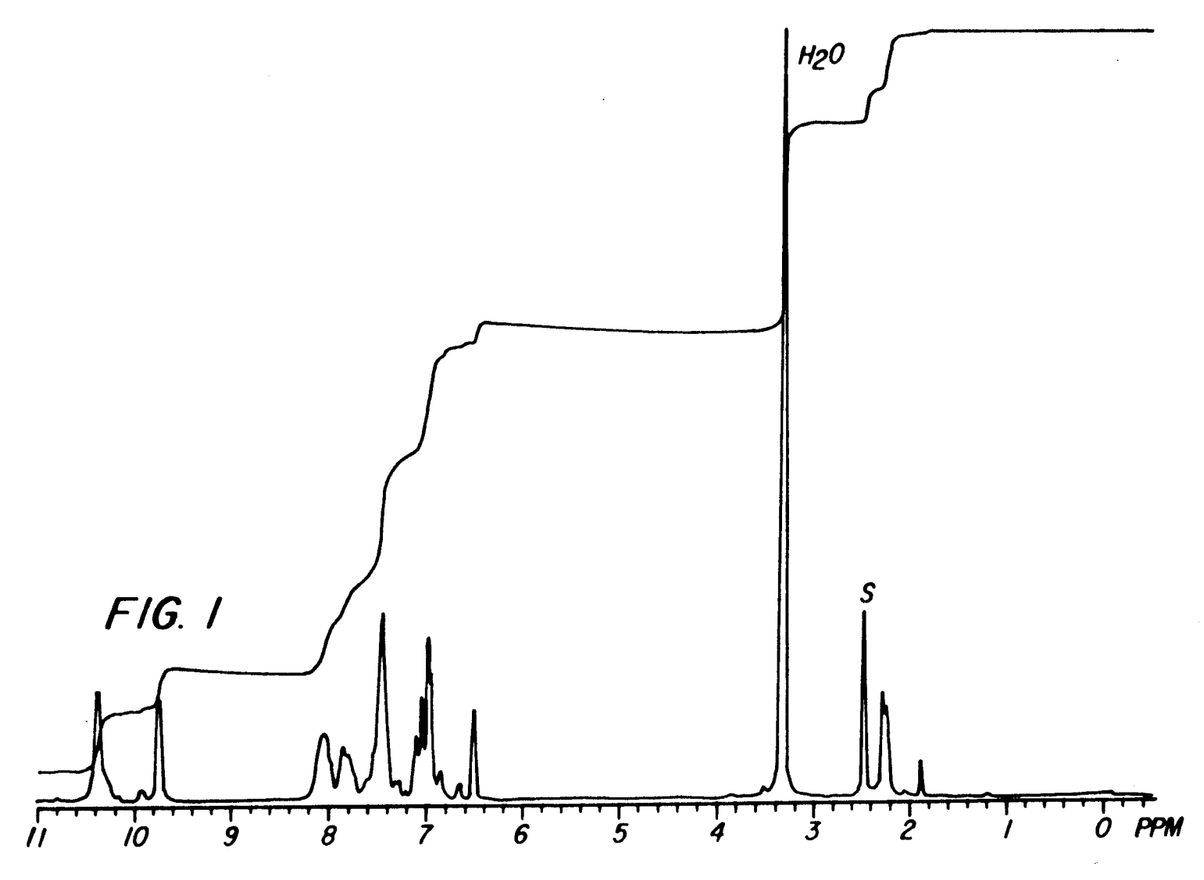
FIG. 1 is a proton nuclear magnetic resonance spectrum of the multiply-branched polyester of Example 5, which was 89 % hydrolysed.

Hydrolysis of the product of Example 4, resulting in phenolic terminal groups:

The polyester product of Example 4 (0.5 grams) was dissolved in a mixture of 100 milliliters of THF, 15 milliliters of methanol and 10 milliliters of water. (It is necessary to keep the polymer in solution and more water or methanol leads to precipitation). Concentrated hydrochloric acid (about 1.5 milliliters) was added (pH=2–3) and the solution was refluxed for 16 hrs. After the hydrolysis the solvent was removed under vacuum, the polymer was dissolved in pure THF and precipitated into water. After filtration and drying, 0.35 grams of product was obtained as a white powder. NMR was conducted as in the preceeding example, using (DMSO-d$_6$). The hydrolysis degree was calculated to be 85% by NMR. The NMR spectrum, shown in FIG. 1, was very similar to that obtained from polymer produced by the silyl-acid chloride process disclosed in C. J. Hawker et al, Journal of the American Chemical Society, Vol. 113, No. 12, (1991) pp 4583–4588, shown in FIG. 2. The degree of branching was calculated from the NMR using the procedure disclosed in that publication and was found to be 49% in comparison to the value of 58% disclosed in that publication for macromolecules produced by the disclosed silyl-acid chloride process.

EXAMPLE 6

Catalyzed Polycondensation of 3,5-diacetoxybenzoic acid 3,5-Diacetoxybenzoic acid was polymerized in the same reaction apparatus as described in Example 4. To the monomer was added p-toluene sulfonic acid (0.050 g, 0.6 mol %) as catalyst. The polymerization was started at 200° C. The reaction was stirred for 1 hour with a slow nitrogen stream. At this stage the polymer was already viscous. The temperature was raised to 230° C. and a vacuum of $2 \times 10^{-2}$ torr was applied for 10 minutes. On cooling, a brittle glassy polymer was obtained that showed a brownish color. The polymer was dissolved in THF, filtered, precipitated into methanol, stirred for several hours, collected by filtration and dried under vacuum. A yield of 5.9 grams of light-brownish powder was obtained, which was 79% of theoretical yield. The polymer was found to have weight average molecular weight of 62,000 from SEC conducted as described in prior Examples.

EXAMPLE 7

Uncatalyzed Co-condensation of 3-acetoxybenzoic Acid and 3,5-diacetoxybenzoic Acid 3-acetoxybenzoic acid (1.8 grams, 0.01 mole) and 3,5-diacetoxybenzoic acid (2.4 grams, 0.01 mole) were placed in a condensation vessel, equipped as described in Example 1, under argon. The polycondensation was carried out in a salt bath maintained at 180°–185° C. No catalyst was added. After about 5 minutes, when the reactants had melted, a slow nitrogen stream was flushed through the polycondensation system. The reaction was continued for 3.5 hours until viscosity had been considerably increased. The nitrogen stream was stopped and a vacuum of $10^{-2}$ torr was applied to the system for about 1 hour. The reaction was stopped by flushing the system with nitrogen and cooling to room temperature. The polymer product was dissolved in THF. Precipitation into methanol provided a yield of 2 grams, which was 67% of theoretical yield. The polymer was found to have weight average molecular weight of 83,000 determined by SEC as in prior Examples. Proton NMR conducted as in the preceeding example, using (DMSO-d$_6$) gave as peaks, in ppm: 2.21, 7.2–8.2. Composition of the copolymer calculated from the integration was found to be 55 percent subunits from 3,5-diacetoxybenzoic acid and 45 percent subunits from 3-acetoxybenzoic acid.

Hydrolysis of the Product of Example 7, Resulting in Phenolic Terminal Groups

The polyester product of Example 7 (0.5 grams) was dissolved in a mixture of 100 milliliters of THF, 15 milliliters of methanol and 10 milliliters of water. (It is necessary to keep the polymer in solution and more water or methanol leads to precipitation). Concentrated hydrochloric acid (about 1.5 milliliters) was added (pH=2-3) and the solution was refluxed for 16 hrs. After the hydrolysis the solvent was removed under vacuum, the polymer was dissolved in pure THF and precipitated into water. After filtration and drying, 0.4 grams of product was obtained as a white powder. NMR was conducted as in the preceeding example, using (DMSO-d$_6$). The hydrolysis degree was calculated to be 65 % by NMR. The NMR spectrum was compared to the spectrum obtained in Example 5 and evidence for branched units was found.

EXAMPLE 9

Uncatalyzed Cocondensation of 3,5-diacetoxybenzoic acid and p-methoxybenzoic acid 3,5-diacetoxybenzoic acid (5.0 grams, 0.021 mole) and p-methoxybenzoic acid (3.2 grams, 0.021 mole) were mixed and heated at 185° C. under a slow nitrogen stream for 4.5 hours. The nitrogen stream was stopped and a vacuum of $8 \times 10^{-2}$ torr was applied to the system for an additional 1.5 hours. The polymer product was dissolved in THF. Precipitation into methanol provided a yield of 4.1 grams. Proton NMR conducted as in the preceeding example, using (DMSO-d$_6$) indicated a polymer material which gave peaks, in ppm: 2.2 (b, methyl), 3.7 (b, methoxy), 6.8–8.2 (b, aromatic protons). From integration of the NMR signals it was found that the ratio of the methoxy and the methyl protons was 0.9, indicating that about 47 of 100 incorporated monomer units were methoxy endcapping units.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

I claim:

1. A method for producing multiply-branched polyester comprising the step of condensing $Z^1$ and $Z^2$ groups of a branching reactant having the general formula $$Z^1-Ar-(Z^2)_j$$

wherein
j is 2 or 3,
Ar is an aryl or heteroaryl group having from 1 to 3, solitary or linked or fused, unsubstituted or substituted by unreactive substituents, five or six membered rings,
and one of $Z^1$ and $Z^2$ is a carboxyl group and the other is a group having the general formula $$-O-\overset{O}{\underset{\|}{C}}-RX_g,$$

wherein
R is an alkyl group having from 1 to 3 carbon atoms,
X is a member selected from the group consisting of fluoro and chloro and g is an integer from 0 to about 7.

2. The method of claim 1 wherein said condensation is an equilibrium reaction and further comprising driving the equilibrium of said condensation toward said multiply-branched polyesters.

3. The method of claim 1 further comprising removing by-product acid produced during said condensation.

4. The method of claim 1 wherein said condensation is incomplete as to $Z^2$ groups of non-terminal repeating units of said multiply-branched polyester.

5. The method of claim 1 wherein individual monomer units of said reactant are condensed as to zero, or one, or more than one $Z^2$ group.

6. The method of claim 1 wherein said linked rings are joined by a linking group which is a member selected from the group consisting of —O—, —S—,

—(CF$_2$)$_d$—, wherein
each $T^1$ is independently selected from the group consisting of alkyl and aryl, and d is an integer from 1 to about 6.

7. The method of claim 1 wherein Ar is a trivalent or quadravalent moiety selected from the group consisting of phenyl, naphthalene, anthracene, phenanthrene, biphenyl, phenylether, diphenylsulfone, diphenylketone, diphenylsulfide, pyridine, quinoline, wherein
n is an integer between 1 and 10, $m^1$, $m^2$, and $m^3$ are each integers selected from 0 to 4 and the sum of all m integers for each structure is 3 or 4, and $T^2$ represents a group which is a member selected from alkyl having from 1 to about 10 carbon atoms, and aryl having from 6 to about 24 carbon atoms.

8. The method of claim 1 wherein Ar is unsubstituted as to groups capable of condensing with $Z^1$ or $Z^2$.

9. The method of claim 1 wherein Ar is unsubstituted or substituted by a member selected from the group consisting of —Cl, —F, alkyl having from 1 to about 4 carbons, alkoxy having from 1 to about 4 carbons, cycloalkyl, chloroalkyl having from 1 to about 4 carbons, and fluoroalkyl having from one to about 4 carbons.

10. The method of claim 1 wherein said reactant is a member selected from the group consisting of -continued

[chemical structures: 4-acetoxy-2,6-pyridinedicarboxylic acid; diphenylmethane diacetoxy dicarboxylic acid derivative; 4-acetoxyquinoline-2,7-dicarboxylic acid; biphenyl diacetoxy dicarboxylic acid; 5-acetoxyisophthalic acid; 3,5-diacetoxybenzoic acid; and 3,4,5-triacetoxybenzoic acid], and 11. The method of claim 1 further comprising co-condensing said branching reactant and a nonbranching reactant having the general formula $$Z^1—Ar—(Z^2)_e$$

wherein
e is 0 or 1,
$Z^1$ and $Z^2$ are each the same group as in said branching reactant, and
each Ar is independently selected from the same moieties as said Ar of said branching reactant.

12. The method of claim 1 wherein said reaction is conducted in the presence of a condensation catalyst.

13. The method of claim 1 wherein said reactant has the general formula $$Z^1—Ar—(O—CO—RX_g)_j$$

and said reaction is conducted at a temperature between about 160° C. and about 240° C.

14. The method of claim 1 wherein said reactant has the general formula $$Z^1—Ar—(COOH)_j$$

and said reaction is conducted at a temperature between about 210° C. and about 270° C.

15. A method for producing multiply-branched polyesters comprising the step of self-condensing a reactant having the general formula $$HOOC—Ar—(O—CO—RX_g)_j$$

or $$X_gR—CO—O—Ar—(COOH)_j$$

wherein
each Ar, R, X, g, and j is independently selected,
j is 2 or 3,
Ar is an aryl or heteroaryl group having from 1 to 3, five or six membered rings, said rings being solitary or linked or fused, and is unsubstituted or substituted by a member selected from the group consisting of —Cl, —F, alkyl having from 1 to about 4 carbons, alkoxy having from 1 to about 4 carbons, cycloalkyl, and haloalkyl having from 1 to about 4 carbons,
R is an alkyl group having from 1 to 3 carbon atoms,
X is selected from the group consisting of fluoro and chloro and
g is an integer from 0 to about 7, and removing byproduct acid produced during said condensation.

16. The method of claim 15 wherein said linked rings are joined by a linking group which is a member selected from the group consisting of —O—, —S—, $$-\overset{O}{\underset{\|}{C}}-, \quad -\overset{O}{\underset{\underset{\|}{O}}{S}}-, \quad -\overset{O}{\underset{\|}{C}}-\overset{}{\underset{T^1}{N}}-, \quad -\overset{CH_3}{\underset{CH_3}{\overset{|}{C}}}-, \quad -\overset{CF_3}{\underset{CF_3}{\overset{|}{C}}}-,$$

$$-C\equiv C-, \quad -\overset{|}{C}=\overset{|}{C}-, \quad -\overset{O}{\underset{T^1}{\overset{\|}{P}}}-, \quad -\overset{}{\underset{T^1}{N}}-, \text{ and}$$

-continued

$-(CF_2)_d-$, wherein
each $R^1$ is independently selected from the group consisting of alkyl and aryl, and d is an integer from 1 to about 6.

17. The method of claim 15 wherein Ar is a trivalent or quadravalent moiety which is a member from the group consisting of phenyl, naphthalene, anthracene, phenanthrene, biphenyl, phenylether, diphenylsulfone, diphenylketone, diphenylsulfide, pyridine, quinoline, , and wherein
n is an integer between 1 and 10, $m^1$, $m^2$, and $m^3$ are each integers selected from 0 to 4 and the sum of all m integers for each structure is 3 or 4, and $T^2$ represents a group selected from alkyl having from 1 to about 10 carbon atoms, and aryl having from 6 to about 24 carbon atoms.

18. A method for producing aromatic polyester comprising the step of condensing at least one compound selected from the group consisting of compounds having the general formula

$$HOOC-Ar-(O-CO-RX_g)_j$$

or $$X_gR-CO-O-Ar-(COOH)_j$$

wherein
each Ar, R, X, g, and j is independently selected,
j is 2 or 3,
Ar is an aryl or heteroaryl group having from 1 to 3, five or six membered rings, said rings being solitary or linked or fused, and is unsubstituted or substituted by a member selected from the group consisting of —Cl, —F, alkyl having from 1 to about 4 carbons, alkoxy having from 1 to about 4 carbons, cycloalkyl, and haloalkyl having from 1 to about 4 carbons,
R is an alkyl group having from 1 to 3 carbon atoms,
X is selected from the group consisting of fluoro and chloro and
g is an integer from 0 to about 7, and removing by-product acid produced during said condensation, to form macromolecules having pluralities of repeating units having the general formulas wherein
each $Z^2$ is a carboxyl group or a group having the general formula $$-O-\overset{O}{\underset{\|}{C}}-RX_g,$$

Ar, R, X and g have the meanings above-indicated,
Q is an ester linkage, and
j is 2 or 3.

* * * * *